(12) United States Patent
Roddy et al.

(10) Patent No.: US 7,631,692 B2
(45) Date of Patent: Dec. 15, 2009

(54) SETTABLE COMPOSITIONS COMPRISING A NATURAL POZZOLAN AND ASSOCIATED METHODS

(75) Inventors: Craig W. Roddy, Duncan, OK (US); Jiten Chatterji, Duncan, OK (US); D. Chad Brenneis, Marlow, OK (US); Ronnie G. Morgan, Waurika, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/420,630

(22) Filed: Apr. 8, 2009

(65) Prior Publication Data

US 2009/0200029 A1 Aug. 13, 2009

Related U.S. Application Data

(60) Continuation-in-part of application No. 12/349,676, filed on Jan. 7, 2009, which is a division of application No. 12/034,886, filed on Feb. 21, 2008, now Pat. No. 7,478,675, which is a continuation-in-part of application No. 11/223,669, filed on Sep. 9, 2005, now Pat. No. 7,445,669.

(51) Int. Cl.
*E21B 33/14* (2006.01)
*E21B 33/138* (2006.01)
*C09K 8/467* (2006.01)

(52) U.S. Cl. ............... 166/250.14; 166/292; 166/309; 106/679; 106/705; 106/716; 106/751; 106/819

(58) Field of Classification Search ............... None
See application file for complete search history.

(56) References Cited

U.S. PATENT DOCUMENTS

| | | | |
|---|---|---|---|
| 2,094,316 A | 9/1937 | Cross et al. | |
| 2,329,940 A | 9/1943 | Ponzer | |
| 2,842,205 A | 7/1958 | Allen et al. | |
| 2,848,051 A | 8/1958 | Williams | |
| 2,871,133 A | 1/1959 | Palonen et al. | |
| 2,880,096 A * | 3/1959 | Hurley | 166/293 |
| 2,945,769 A | 7/1960 | Gama et al. | |
| 3,168,139 A | 2/1965 | Kennedy et al. | |
| 3,454,095 A | 7/1969 | Messenger et al. | |
| 3,467,193 A * | 9/1969 | Messenger | 166/292 |
| 3,499,491 A | 3/1970 | Wyant et al. | |
| 3,557,876 A | 1/1971 | Tragesser | |
| 3,748,159 A | 7/1973 | George | |
| 3,876,005 A | 4/1975 | Fincher et al. | |
| 3,887,009 A | 6/1975 | Miller et al. | |
| 3,887,385 A | 6/1975 | Quist et al. | |
| 4,018,617 A | 4/1977 | Nicholson | |
| 4,031,184 A | 6/1977 | McCord | |
| 4,176,720 A | 12/1979 | Wilson | |
| 4,268,316 A | 5/1981 | Wills et al. | |
| 4,341,562 A | 7/1982 | Ahlbeck | |
| RE31,190 E | 3/1983 | Detroit et al. | |
| 4,407,677 A | 10/1983 | Wills et al. | |
| 4,432,800 A | 2/1984 | Kneller et al. | |
| 4,435,216 A | 3/1984 | Diehl et al. | |
| 4,460,292 A | 7/1984 | Durham et al. | |
| 4,494,990 A | 1/1985 | Harris | |
| 4,515,635 A | 5/1985 | Rao et al. | |
| 4,519,452 A | 5/1985 | Tsao et al. | |
| 4,555,269 A | 11/1985 | Rao et al. | |
| 4,614,599 A | 9/1986 | Walker | |
| 4,624,711 A | 11/1986 | Styron | |
| 4,676,317 A | 6/1987 | Fry et al. | |
| 4,741,782 A | 5/1988 | Styron | |
| 4,784,223 A | 11/1988 | Worrall et al. | |
| 4,883,125 A | 11/1989 | Wilson et al. | |
| 4,941,536 A | 7/1990 | Brothers et al. | |
| 4,992,102 A | 2/1991 | Barbour | |
| 5,030,366 A | 7/1991 | Wilson et al. | |
| 5,049,288 A | 9/1991 | Brothers et al. | |
| 5,058,679 A | 10/1991 | Hale et al. | |
| RE33,747 E | 11/1991 | Hartley et al. | |
| 5,086,850 A | 2/1992 | Harris et al. | |
| 5,121,795 A | 6/1992 | Ewert et al. | |

(Continued)

FOREIGN PATENT DOCUMENTS

CA 2153372 1/2006

(Continued)

OTHER PUBLICATIONS

U.S. Appl. No. 12/263,954, filed Nov. 3, 2008, Roddy.

(Continued)

*Primary Examiner*—George Suchfield
(74) *Attorney, Agent, or Firm*—Craig W. Roddy; Tumey, LLP

(57) ABSTRACT

An embodiment of a method of cementing comprises: introducing a cement composition into a subterranean formation, wherein the cement composition comprises cement kiln dust, a natural pozzolan, and water; and allowing the cement composition to set. Another embodiment of a method comprises: introducing a cement composition into a subterranean formation, wherein the cement composition comprises a cement, a natural pozzolan, and water, wherein the cement comprises Portland cement interground with burned shale; and allowing the cement composition to set. Another embodiment includes a cement composition comprising at least one additive selected from the group consisting of cement, cement kiln dust, Portland cement interground with burned shale, and a combination thereof; a natural pozzolan; and water.

26 Claims, No Drawings

U.S. PATENT DOCUMENTS

| | | |
|---|---|---|
| 5,123,487 A | 6/1992 | Harris et al. |
| 5,125,455 A | 6/1992 | Harris et al. |
| 5,127,473 A | 7/1992 | Harris et al. |
| 5,183,505 A | 2/1993 | Spinney |
| 5,213,160 A | 5/1993 | Nahm et al. |
| 5,238,064 A | 8/1993 | Dahl et al. |
| 5,266,111 A | 11/1993 | Barbour |
| 5,295,543 A | 3/1994 | Terry et al. |
| 5,305,831 A | 4/1994 | Nahm |
| 5,314,022 A | 5/1994 | Cowan et al. |
| 5,327,968 A | 7/1994 | Onan et al. |
| 5,337,824 A | 8/1994 | Cowan |
| 5,352,288 A | 10/1994 | Mallow |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,423,379 A | 6/1995 | Hale et al. |
| 5,439,056 A | 8/1995 | Cowan |
| 5,458,195 A | 10/1995 | Totten et al. |
| 5,464,060 A | 11/1995 | Hale et al. |
| 5,472,051 A | 12/1995 | Brothers |
| 5,476,144 A | 12/1995 | Nahm et al. |
| 5,494,513 A | 2/1996 | Fu et al. |
| 5,499,677 A | 3/1996 | Cowan |
| 5,515,921 A | 5/1996 | Cowan et al. |
| 5,518,996 A | 5/1996 | Maroy et al. |
| 5,520,730 A | 5/1996 | Barbour |
| 5,529,624 A | 6/1996 | Riegler |
| 5,536,311 A | 7/1996 | Rodrigues |
| 5,542,782 A | 8/1996 | Carter et al. |
| 5,569,324 A | 10/1996 | Totten et al. |
| 5,580,379 A | 12/1996 | Cowan |
| 5,585,333 A | 12/1996 | Dahl et al. |
| 5,588,489 A | 12/1996 | Chatterji et al. |
| 5,673,753 A | 10/1997 | Hale et al. |
| 5,711,383 A | 1/1998 | Terry et al. |
| 5,716,910 A | 2/1998 | Totten et al. |
| 5,728,654 A | 3/1998 | Dobson et al. |
| 5,851,960 A | 12/1998 | Totten et al. |
| 5,866,516 A | 2/1999 | Costin |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,457,524 B1 | 10/2002 | Roddy |
| 6,478,869 B2 | 11/2002 | Reddy et al. |
| 6,488,763 B2 | 12/2002 | Brothers et al. |
| 6,494,951 B1 | 12/2002 | Reddy et al. |
| 6,500,252 B1 | 12/2002 | Chatterji et al. |
| 6,508,305 B1 | 1/2003 | Brannon et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Crook et al. |
| 6,626,243 B1 | 9/2003 | Go Boncan |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,048,053 B2 | 5/2006 | Santra et al. |
| 7,077,203 B1 | 7/2006 | Roddy et al. |
| 7,174,962 B1 | 2/2007 | Roddy et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,284,609 B2 | 10/2007 | Roddy et al. |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,445,669 B2 | 11/2008 | Roddy et al. |
| 7,478,675 B2 | 1/2009 | Roddy et al. |
| 2002/0033121 A1 | 3/2002 | Marko |
| 2002/0073897 A1 | 6/2002 | Trato |
| 2002/0117090 A1 | 8/2002 | Ku |
| 2003/0116065 A1 | 6/2003 | Griffith et al. |
| 2003/0116887 A1 | 6/2003 | Scott |
| 2003/0167970 A1 | 9/2003 | Polston |
| 2004/0007162 A1 | 1/2004 | Morioka et al. |
| 2004/0040475 A1 | 3/2004 | De La Roij et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |

| | | | |
|---|---|---|---|
| 2004/0187740 A1 | 9/2004 | Timmons | |
| 2004/0188091 A1 | 9/2004 | Luke et al. | |
| 2004/0191439 A1 | 9/2004 | Bour et al. | |
| 2004/0211562 A1 | 10/2004 | Brothers et al. | |
| 2004/0211564 A1 | 10/2004 | Brothers et al. | |
| 2004/0244650 A1 | 12/2004 | Brothers | |
| 2004/0244977 A1 | 12/2004 | Luke et al. | |
| 2004/0256102 A1 | 12/2004 | Trato | |
| 2005/0000734 A1 | 1/2005 | Getzlaf et al. | |
| 2005/0034867 A1 | 2/2005 | Griffith et al. | |
| 2005/0056191 A1 | 3/2005 | Brothers et al. | |
| 2005/0072599 A1 | 4/2005 | Luke et al. | |
| 2005/0084334 A1 | 4/2005 | Shi et al. | |
| 2005/0098317 A1 | 5/2005 | Reddy et al. | |
| 2005/0133221 A1 | 6/2005 | Chatterji et al. | |
| 2006/0025312 A1 | 2/2006 | Santra et al. | |
| 2006/0054319 A1* | 3/2006 | Fyten et al. | 166/292 |
| 2006/0162926 A1 | 7/2006 | Roddy | |
| 2006/0166834 A1 | 7/2006 | Roddy | |
| 2006/0260512 A1 | 11/2006 | Nordmeyer | |
| 2007/0056479 A1 | 3/2007 | Gray | |
| 2007/0137528 A1 | 6/2007 | LeRoy-Delage et al. | |
| 2007/0186820 A1 | 8/2007 | O'Hearn | |
| 2008/0229979 A1* | 9/2008 | Lewis et al. | 106/724 |
| 2009/0071650 A1 | 3/2009 | Roddy et al. | |
| 2009/0105099 A1 | 4/2009 | Warrender et al. | |
| 2009/0124522 A1* | 5/2009 | Roddy | 507/269 |

FOREIGN PATENT DOCUMENTS

| | | |
|---|---|---|
| EP | 0814067 | 12/1997 |
| EP | 1236701 | 9/2002 |
| EP | 1394137 | 7/2003 |
| EP | 1348831 | 10/2003 |
| GB | 1469954 | 4/1997 |
| JP | 52117316 | 10/1977 |
| JP | 10110487 | 4/1998 |
| SU | 1373781 | 2/1988 |
| WO | WO 83/01443 | 9/1982 |
| WO | WO 98/54108 | 12/1998 |
| WO | WO 00/63134 | 1/2000 |
| WO | WO 03/031364 | 4/2003 |
| WO | WO 2005/047212 | 5/2005 |
| WO | WO 2005/061846 | 7/2005 |
| WO | WO2006032841 | 3/2006 |

OTHER PUBLICATIONS

U.S. Appl. No. 12/264,010, filed Nov. 3, 2008, Roddy.
U.S. Appl. No. 12/283,398, filed Sep. 11, 2008, Roddy.
U.S. Appl. No. 12/349,676, filed Jan. 7, 2009, Roddy.
U.S. Appl. No. 12/420,630, filed Apr. 8, 2009, Roddy.
Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing" Society of Professional Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.

Naiqian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art, Petroleum Engineer International", Apr. 1978.
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al. Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential For Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", dated 1999.
HES Brochure "HR-4 Cement Retarder", 1999.
HES Brochure HR-5 Cement Additive, 1998.
HES Brochure "HR-7 Cement Retarder", 1999.
HES Brochure "Pozmix A Cement Additive", 1999.
HES Brochure "SCR-100 Cement Retarder A Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
Lafarge brochure "TerraCem™", Aug. 2006.
Lafarge MSDS "Cement Kiln Dust", Mar. 3, 2005.
Lafarge MSDS "LaFarge Blended Cement (cement)", Mar. 3, 2005.
TXI Material Safety Data Sheet for Pressur-Seal, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-793, 2005.
Answer 3 of 24 Chemical Abstracts on STN "Effect of cement kiln dust substitution on chemical and physical properties and compressive strength of Portland and slag cements", Adb El-aleem et al. (abstract only), 2005.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Foreign Search Report from a Related Application, May 8, 2007.
Foreign Search Report from a Related Application, Dec. 19, 2006.
Foreign Search Report from a Related Application, Dec. 1, 2006.
Foreign Search Report from a Related Application, Nov. 2, 2006.
Foreign Search Report from a Related Application, Oct. 27, 2006.
Foreign Search Report from a Related Application, Jul. 5, 2006.
Foreign Search Report from a Related Application, Sep. 9, 2005.
Office Action from U.S. Appl. No. 11/223,669 (Notice of Allowance), Jun. 30, 2008.
Office Action from U.S. Appl. Serial No. 11/223,669, Apr. 8, 2008.
Office Action from U.S. Appl. No. 11/223,703 (Notice of Allowance), Feb. 27, 2008.

Office Action from U.S. Appl. No. 11/256,824 (Notice of Allowance), Feb. 27, 2008.
Office Action from U.S. Appl. No. 11/223,669, Jan. 29, 2008.
Office Action from U.S. Appl. No. 11/402,741 (Notice of Allowance), Dec. 13, 2007.
Office Action from U.S. Appl. No. 11/223,750 (Notice of Allowance), Dec. 11, 2007.
Office Action from U.S. Appl. No. 11/402,741, Oct. 24, 2007.
Office Action from U.S. Appl. No. 11/257,261 (Notice of Allowance), Oct. 23, 2007.
Office Action from U.S. Appl. No. 11/416,754 (Notice of Allowance), Oct. 17, 2007.
Office Action from U.S. Appl. No. 11/223,750, Oct. 16, 2007.
Office Action from U.S. Appl. No. 11/223,669, Oct. 9, 2007.
Office Action from U.S. Appl. No. 11/402,741, Sep. 6, 2007.
Office Action from U.S. Appl. No. 11/271,690 (Notice of Allowance), Aug. 13, 2007.
Office Action from U.S. Appl. No. 11/257,261, Aug. 10, 2007.
Office Action from U.S. Appl. No. 11/223,485 (Notice of Allowance), Aug. 3, 2007.
Office Action from U.S. Appl. No. 11/416,754 (Notice of Allowance), Jul. 2, 2007.
Office Action from U.S. Appl. No. 11/223,669, Jun. 18, 2007.
Office Action from U.S. Appl. No. 11/402,741, May 29, 2007.
Office Action from U.S. Appl. No. 11/223,703, Apr. 25, 2007.
Office Action from U.S. Appl. No. 11/402,741, Mar. 22, 2007.
Office Action from U.S. Appl. No. 11/271,690, Mar. 13, 2007.
Office Action from U.S. Appl. No. 11/223,669, Feb. 28, 2007.
Office Action from U.S. Appl. No. 11/223,485, Feb. 28, 2007.
Office Action from U.S. Appl. No. 11/402,741, Feb. 2, 2007.
Office Action from U.S. Appl. No. 11/223,703, Jan. 17, 2007.
Office Action from U.S. Appl. No. 11/484,951, Dec. 21, 2006.
Office Action from U.S. Appl. No. 11/484,951, Oct. 26, 2006.
Office Action from U.S. Appl. No. 11/402,741, Oct. 19, 2006.
Office Action from U.S. Appl. No. 11/440,627, Aug. 21, 2006.
Office Action from U.S. Appl. No. 12/034,886 (Notice of Allowance), Oct. 21, 2008.
Office Action from U.S. Appl. No. 12/263,800, May 1, 2009.
Nelson, "Well Cementing", 1990.
"Fly Ash Resource Center-Pozzolan," available at http://www.rmajko.com/pozzolan.htm, Apr. 20, 2009.
EPO Application No. 06794648.3 Examination Report dated Apr. 17, 2009, pp. 1-8.
EPO Application No. 06779194.7 Examination Report dated May 29, 2009, pp. 1-5.
USPTO Office Action for U.S. Appl. No. 12/283,398 dated Jul. 15, 2009.
HES brochure entitled "Pozmix Cement & Pozmix 140 Information", pp. 1-53, Sep. 1957.
HES brochure entitled "The Story of Pozmix", pp. 1-6 (undated).
USPTO Office Action for U.S. Appl. No. 12/263,800 dated Jul. 28, 2009.
Sugama, "Carbonation of Hydrothermally Treated Phosphate-Bonded Calcium Aluminate Cements", pp. 1-11, (undated).
HES brochure entitled "Pozmix Cement & Pozmix 140", pp. 1-39, (undated).
Answer 13 of 24 Chemical Abstracts on STN "Manufacture of ceramic particles from floatstone and fly ash", CN 1182062 abstract only, (undated).

* cited by examiner

SETTABLE COMPOSITIONS COMPRISING A NATURAL POZZOLAN AND ASSOCIATED METHODS

CROSS-REFERENCE TO RELATED APPLICATIONS

This application is a continuation in part of U.S. application Ser. No. 12/349,676, entitled "Extended Settable Compositions Comprising Cement Kiln Dust and Associated Methods," filed on Jan. 7, 2009, which is a divisional of U.S. application Ser. No. 12/034,886 entitled "Extended Settable Compositions Comprising Cement Kiln Dust and Associated Methods, filed on Feb. 21, 2008, which is a continuation in part of U.S. application Ser. No. 11/223,669 entitled "Settable Compositions Comprising Cement Kiln Dust and Additive(s)," filed Sep. 9, 2005, the entire disclosures of which are incorporated herein by reference.

BACKGROUND

The present invention relates to cementing operations and, more particularly, in certain embodiments, to settable compositions comprising water, a natural pozzolan, and at least one of cement, Portland cement interground with burned shale, or cement kiln dust.

Settable compositions may be used in primary cementing operations whereby pipe strings, such as casing and liners, are cemented in well bores. In performing primary cementing, a settable composition may be pumped into an annular space between the walls of a well bore and the pipe string disposed therein. The settable composition sets in the annular space, thereby forming an annular sheath of hardened cement (e.g., a cement sheath) that supports and positions the pipe string in the well bore and bonds the exterior surface of the pipe string to the walls of the well bore.

Settable compositions also may be used in remedial cementing operations, such as sealing voids in a pipe string or a cement sheath. As used herein the term "void" refers to any type of space, including fractures, holes, cracks, channels, spaces, and the like. Such voids may include: holes or cracks in the pipe strings; holes, cracks, spaces, or channels in the cement sheath; and very small spaces (commonly referred to as "microannuli") between the cement sheath and the exterior surface of the well casing or formation. Sealing such voids may prevent the undesired flow of fluids (e.g., oil, gas, water, etc.) and/or fine solids into, or from, the well bore. The sealing of such voids, whether or not made deliberately, has been attempted by introducing a substance into the void and permitting it to remain therein to seal the void. If the substance does not fit into the void, a bridge, patch, or sheath may be formed over the void to possibly produce a termination of the undesired fluid flow. Substances used heretofore in methods to terminate the undesired passage of fluids through such voids include settable compositions comprising water and hydraulic cement, wherein the methods employ hydraulic pressure to force the settable composition into the void. Once placed into the void, the settable composition may be permitted to harden.

Remedial cementing operations also may be used to seal portions of subterranean formations or portions of gravel packs. The portions of the subterranean formation may include permeable portions of a formation and fractures (natural or otherwise) in the formation and other portions of the formation that may allow the undesired flow of fluid into, or from, the well bore. The portions of the gravel pack include those portions of the gravel pack, wherein it is desired to prevent the undesired flow of fluids into, or from, the well bore. A "gravel pack" is a term commonly used to refer to a volume of particulate materials (such as sand) placed into a well bore to at least partially reduce the migration of unconsolidated formation particulates into the well bore. While screenless gravel packing operations are becoming more common, gravel packing operations commonly involve placing a gravel pack screen in the well bore neighboring a desired portion of the subterranean formation, and packing the surrounding annulus between the screen and the well bore with particulate materials that are sized to prevent and inhibit the passage of formation solids through the gravel pack with produced fluids. Among other things, this method may allow sealing of the portion of the gravel pack to prevent the undesired flow of fluids without requiring the gravel pack's removal.

Settable compositions also may be used during the drilling of the well bore in a subterranean formation. For example, in the drilling of a well bore, it may be desirable, in some instances, to change the direction of the well bore. In some instances, settable compositions may be used to facilitate this change of direction, for example, by drilling a pilot hole in a hardened mass of cement, commonly referred to as a "kickoff plug," placed in the well bore. Certain formations may cause the drill bit to drill in a particular direction. For example, in a vertical well, this may result in an undesirable well bore deviation from vertical. In a directional well (which is drilled at an angle from vertical), after drilling an initial portion of the well bore vertically, the direction induced by the formation may make following the desired path difficult. In those and other instances, special directional drilling tools may be used, such as a whipstock, a bent sub-downhole motorized drill combination, and the like. Generally, the directional drilling tool or tools used may be orientated so that a pilot hole is produced at the desired angle to the previous well bore in a desired direction. When the pilot hole has been drilled for a short distance, the special tool or tools are removed, if required, and drilling along the new path may be resumed. To help ensure that the subsequent drilling follows the pilot hole, it may be necessary to drill the pilot hole in a kickoff plug, placed in the well bore. In those instances, prior to drilling the pilot hole, a settable composition may be introduced into the well bore and allowed to set to form a kickoff plug therein. The pilot hole then may be drilled in the kickoff plug, and the high strength of the kickoff plug helps ensure that the subsequent drilling proceeds in the direction of the pilot hole.

In certain applications, extended settable compositions have been used heretofore. As used herein, the term "extended settable composition" refers to a settable composition capable of remaining in a pumpable fluid state for an extended period of time (e.g., at least about 1 day). A fluid is considered to be in a pumpable fluid state where the fluid has a viscosity of less than 70 Bc, as measured using an FANN Atmospheric Consistometer Model 165AT (available from FANN Instrument Company, Houston, Tex.) at room temperature (for example, 78° F.). In general, the extended settable compositions comprise cement, water, and a set retarder and remain in a pumpable fluid state for an extended period of time. When desired for use, the extended settable composition should be capable of being activated whereby reasonable compressive strengths are developed. For example, a cement set accelerator may be added to the extended settable composition whereby the composition sets into a hardened mass. Among other things, the extended settable compositions of the present invention may be suitable for use in well bore applications, for example, where it is desired to prepare the settable composition in advance. This may allow, for example, the settable composition to be stored prior to its use.

In addition, this may allow, for example, the settable composition to be prepared at a convenient location and then transported to the job site for use. Accordingly, capital expenditures associated with the cementing operations may be reduced due to a reduction in the need for on-site bulk storage and mixing equipment.

Settable compositions (and extended settable compositions) used heretofore commonly comprise Portland cement. Portland cement generally is a major component of the cost for the settable compositions. To reduce the cost of such settable compositions, other components may be included in the settable composition in addition to, or in place of, the Portland cement. Such components may include fly ash, slag cement, shale, metakaolin, micro-fine cement, and the like. "Fly ash," as that term is used herein, refers to the residue from the combustion of powdered or ground coal, wherein the fly ash carried by the flue gases may be recovered, for example, by electrostatic precipitation. "Slag," as that term is used herein, refers to a granulated, blast furnace by-product formed in the production of cast iron and generally comprises the oxidized impurities found in iron ore. Slag cement generally comprises slag and a base, for example, such as sodium hydroxide, sodium bicarbonate, sodium carbonate, or lime, to produce a settable composition that, when combined with water, may set to form a hardened mass.

During the manufacture of cement, a waste material commonly referred to as "CKD" is generated. "CKD," as that term is used herein, refers to a partially calcined kiln feed which is removed from the gas stream and collected, for example, in a dust collector during the manufacture of cement. Usually, large quantities of CKD are collected in the production of cement that are commonly disposed of as waste. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$.

SUMMARY

The present invention relates to cementing operations and, more particularly, in certain embodiments, to settable compositions comprising water, a natural pozzolan, and at least one of cement, Portland cement interground with burned shale, or cement kiln dust.

An embodiment of the present invention provides a method of cementing in a subterranean formation. The method may comprise introducing a cement composition into the subterranean formation, wherein the cement composition comprises cement kiln dust, a natural pozzolan, and water. The method further may comprise allowing the cement composition to set.

Another embodiment of the present invention provides a method of cementing in a subterranean formation. The method may comprise introducing a cement composition into the subterranean formation, wherein the cement composition comprises a cement, a natural pozzolan, and water, wherein the cement comprises Portland cement interground with burned shale. The method further may comprise allowing the cement composition to set.

Yet another embodiment of the present invention provides a cement composition comprising at least one additive selected from the group consisting of cement, cement kiln dust, Portland cement interground with burned shale, and a combination thereof. The cement composition may further comprise a natural pozzolan and water.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, in certain embodiments, to settable compositions comprising water, a natural pozzolan, and at least one of cement, Portland cement interground with burned shale, or cement kiln dust. There may be several potential advantages to the methods and compositions of the present invention, only some of which may be alluded to herein. One of the many potential advantages of the methods and compositions of the present invention is that the inclusion of the cement kiln dust and/or natural pozzolan in the settable composition may reduce the amount of a higher cost additive, such as Portland cement, resulting in a more economical settable composition.

The settable compositions of the present invention generally may comprise water and a natural pozzolan, in accordance with embodiments of the present invention. In addition, the settable compositions of the present invention further may comprise at least one of cement or cement kiln dust. For example, a settable composition of the present invention may comprise hydraulic cement, cement kiln dust, a natural pozzolan, and water. In certain embodiments, the cement may comprise Portland cement interground with burned shale. By way of example, a settable composition of the present invention may comprise cement, a natural pozzolan, and water, wherein the cement comprises Portland cement interground with burned shale. As described in more detail herein, embodiments of the settable compositions of the present invention may be foamed and/or extended as desired by those of ordinary skill in the art.

The settable compositions of the present invention should have a density suitable for a particular application as desired by those of ordinary skill in the art, with the benefit of this disclosure. In some embodiments, the settable compositions of the present invention may have a density in the range of about 8 pounds per gallon ("ppg") to about 16 ppg. In the foamed embodiments, the foamed settable compositions of the present invention may have a density in the range of about 8 ppg to about 13 ppg.

The water used in the settable compositions of the present invention may include, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the settable composition. In some embodiments, the water may be included in an amount sufficient to form a pumpable slurry. In some embodiments, the water may be included in the settable compositions of the present invention in an amount in the range of about 40% to about 200% by weight of cementitious components ("bwoc"). Cementitious components include those components that set and harden, either by themselves or in combination with another component, by reaction with water, such as hydraulic cement, cement kiln dust, a natural pozzolan, and the like. In some embodiments, the water may be included in an amount in the range of about 40% to about 150% bwoc.

Hydraulic cement is a component that may be included in embodiments of the settable compositions of the present invention. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, G, and H cements according to American Petroleum Institute, API Specification for Materials and Testing for Well Cements, API Specification 10, Fifth Ed., Jul. 1, 1990. In addition, in some embodiments, cements suitable for use in the present invention may be classified as ASTM Type I, II, or III.

Where present the hydraulic cement generally may be included in the settable compositions in an amount sufficient to provide the desired compressive strength, density, and/or cost. In some embodiments, the hydraulic cement may be present in the settable compositions of the present invention in an amount in the range of 0% to about 99% bwoc. In some embodiments, the hydraulic cement may be present in the settable compositions of the present invention in an amount in the range of 0% to about 95% bwoc. In some embodiments, the hydraulic cement may be present in the settable compositions of the present invention in an amount in the range of about 20% to about 95% bwoc. In some embodiments, the hydraulic cement may be present in the settable compositions of the present invention in an amount in the range of about 50% to about 90% bwoc.

An example of a suitable hydraulic cement comprises a Portland cement interground with burned shale. The calcination of shale results in what is commonly referred to as "burned shale." The calcination process may occur at temperatures as high as about 2,200° F. or higher. By way of example, shale may be calcined at temperatures of about 2,700° F. in accordance with embodiments of the present invention. The burned shale may then be interground with the Portland cement. For example, a mixture of Portland cement and burned shale may be ground with a ball mill. In certain embodiments, the hydraulic cement may comprise about 73% by weight Portland cement (such as Portland Class C cement) interground with about 27% burned shale. In certain embodiments, the burned shale that is interground with the Portland cement may comprise Eagleford shale. An example of a suitable Portland cement interground with burned shale is available from TXI Energy Services, Inc. under the trade name TXI Lightweight cement.

Another example of a suitable hydraulic cement comprises a pozzolana cement. In some embodiments, a pozzolana cement that may be suitable for use comprises fly ash. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime so that, when mixed with water, it sets to form a hardened mass. Class F fly ash generally does not contain sufficient lime, so an additional source of calcium ions is required for the Class F fly ash to form a settable composition with water. In some embodiments, lime may be mixed with Class F fly ash in an amount in the range of about 0.1% to about 25% by weight of the fly ash. In some instances, the lime may be hydrated lime. Suitable examples of fly ash include, but are not limited to, POZMIX® A cement additive, commercially available from Halliburton Energy Services, Inc., Duncan, Okla.

Where present, the fly ash generally may be included in the settable compositions in an amount sufficient to provide the desired compressive strength, density, and/or cost. In some embodiments, the fly ash may be present in the settable compositions of the present invention in an amount in the range of about 5% to about 75% bwoc. In some embodiments, the fly ash may be present in the settable compositions of the present invention in an amount in the range of about 10% to about 60% bwoc.

Another example of a suitable hydraulic cement comprise a slag cement. In some embodiments, a slag cement that may be suitable for use may comprise slag. Slag generally does not contain sufficient basic material, so slag cement further may comprise a base to produce a settable composition that may react with water to set to form a hardened mass. Examples of suitable sources of bases include, but are not limited to, sodium hydroxide, sodium bicarbonate, sodium carbonate, lime, and combinations thereof.

Where present, the slag cement generally may be included in the settable compositions in an amount sufficient to provide the desired compressive strength, density, and/or cost. In some embodiments, the slag cement may be present in the settable compositions of the present invention in an amount in the range of 0% to about 99% bwoc. In some embodiments, the slag cement may be present in the settable compositions of the present invention in an amount in the range of about 5% to about 75% bwoc.

CKD is another component that may be included in embodiments of the settable compositions of the present invention. The CKD should be included in the settable compositions in an amount sufficient to provide the desired compressive strength, density, and/or cost reduction. In some embodiments, the CKD may be present in the settable compositions of the present invention in an amount in the range of about 1% to about 99% bwoc. In some embodiments, the CKD may be present in the settable compositions of the present invention in an amount in the range of about 5% to about 99% bwoc. In some embodiments, the CKD may be present in the settable compositions of the present invention in an amount in the range of about 5% to about 80% bwoc. In some embodiments, the CKD may be present in the settable compositions of the present invention in an amount in the range of about 10% to about 50% bwoc.

A natural pozzolan is another component that may be included in embodiments of the settable compositions of the present invention. Natural pozzolans are generally present on the Earth's surface and set and harden in the presence of hydrated lime and water. Examples of natural pozzolans include pumicite, diatomaceous earth, volcanic ash, opaline shale, tuff, and combinations thereof. Generally, pumicite is a volcanic rock that exhibits cementitious properties, in that it may set and harden in the presence of hydrated lime and water. Hydrated lime may be used in combination with the pumicite, for example, to provide sufficient calcium ions for pumicite to set. The natural pozzolan may be used, among other things, to replace higher cost cementitious components, such as Portland cement, in embodiments of the settable compositions, resulting in more economical settable compositions. In some embodiments, the natural pozzolan may be present in an amount in the range of from about 0.1% to about 50% bwoc. In some embodiments, the natural pozzolan may be present in an amount in the range of from about 25% to about 50% bwoc.

Metakaolin is another component that may be included in embodiments of the settable compositions of the present invention includes metakaolin. Generally, metakaolin is a white pozzolan that may be prepared by heating kaolin clay, for example, to temperatures in the range of about 600° to about 800° C. In some embodiments, the metakaolin may be present in the settable compositions of the present invention in an amount in the range of about 5% to about 95% bwoc. In some embodiments, the metakaolin may be present in an amount in the range of about 10% to about 50% bwoc.

Shale is another component that may be included in embodiments of the settable compositions of the present invention. As set forth above, burned shale may be interground with Portland cement, in accordance with embodiments of the present invention. Among other things, shale included in the settable compositions may react with excess lime to form a suitable cementing material, for example, calcium silicate hydrate. A variety of shales are suitable, including those comprising silicon, aluminum, calcium, and/or magnesium. An example of a suitable shale comprises vitrified shale. Suitable examples of vitrified shale include, but are not limited to, PRESSUR-SEAL FINE LCM material and PRESSUR-SEAL COARSE LCM material, which are commercially available from TXI Energy Services, Inc., Houston, Tex. Generally, the shale may have any particle size distribution as desired for a particular application. In certain embodiments, the shale may have a particle size distribution in the range of about 37 micrometers to about 4,750 micrometers.

Where present, the shale may be included in the settable compositions of the present invention in an amount sufficient to provide the desired compressive strength, density, and/or cost. In some embodiments, the shale may be present in an amount in the range of about 5% to about 75% bwoc. In some embodiments, the shale may be present in an amount in the range of about 10% to about 35% bwoc. One of ordinary skill in the art, with the benefit of this disclosure, will recognize the appropriate amount of the shale to include for a chosen application.

Zeolite is another component that may be included in embodiments of the settable compositions of the present invention. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. Examples of suitable zeolites are described in more detail in U.S. Patent Publication No. 2007/10056475 A1. An example of a suitable source of zeolite is available from the C2C Zeolite Corporation of Calgary, Canada. In some embodiments, the zeolite may be present in the settable compositions of the present invention in an amount in the range of about 5% to about 65% bwoc. In certain embodiments, the zeolite may be present in an amount in the range of about 10% to about 40% bwoc.

Lime is another component that may be included in embodiments of the settable compositions of the present invention. In certain embodiments, the lime may be hydrated lime. Where present, the lime may be present in the settable compositions in an amount in the range of from about 1% to about 40% bwoc. In some embodiments, the lime may be present in the settable compositions in an amount in the range of from about 5% to about 20% bwoc.

A set retarding additive is another component that may be included in embodiments of the settable compositions of the present invention. As used herein, the term "set retarding additive" refers to an additive that retards the setting of the settable compositions of the present invention. Examples of suitable set retarding additives include, but are not limited to, ammonium, alkali metals, alkaline earth metals, metal salts of sulfoalkylated lignins, hydroxycarboxy acids, copolymers that comprise acrylic acid or maleic acid, and combinations thereof. One example of a suitable sulfoalkylate lignin comprises a sulfomethylated lignin. Suitable set retarding additives are disclosed in more detail in U.S. Pat. No. Re. 31,190, the entire disclosure of which is incorporated herein by reference. Suitable set retarding additives are commercially available from Halliburton Energy Services, Inc. under the trade names HR® 4, HR® 5, HR® 7, HR® 12, HR® 15, HR® 25, HR® 601, SCR™ 100, and SCR™ 500 retarders. Generally, where used, the set retarding additive may be included in the settable compositions of the present invention in an amount sufficient to provide the desired set retardation. In some embodiments, the set retarding additive may be present in an amount in the range of about 0.1% to about 5% bwoc.

Optionally, other additional additives may be added to the settable compositions of the present invention as deemed appropriate by one skilled in the art, with the benefit of this disclosure. Examples of such additives include, but are not limited to, strength-retrogression additives, set accelerators, weighting agents, lightweight additives, gas-generating additives, mechanical property enhancing additives, lost-circulation materials, filtration-control additives, dispersants, defoaming agents, foaming agents, thixotropic additives, and combinations thereof. Specific examples of these, and other, additives include crystalline silica, amorphous silica, fumed silica, salts, fibers, hydratable clays, microspheres, rice husk ash, elastomers, resins, latex, combinations thereof, and the like. A person having ordinary skill in the art, with the benefit of this disclosure, will readily be able to determine the type and amount of additive useful for a particular application and desired result.

As mentioned above, the settable compositions of the present invention may be foamed, for example, further comprising a gas and a surfactant, in accordance with embodiments of the present invention. A foamed settable composition may be used, for example, where it is desired for the settable composition to be lightweight. For example, a foamed settable composition of the present invention may comprise hydraulic cement, cement kiln dust, a natural pozzolan, a gas, a surfactant and water. By way of further example, a foamed settable composition of the present invention may comprise cement, a natural pozzolan, a gas, a surfactant, and water, wherein the cement comprise Portland cement interground with burned shale. Other suitable additives, such as those discussed previously, also may be included in the foamed settable compositions of the present invention as desired by those of ordinary skill in the art, with the benefit of this disclosure.

The gas used in the foamed settable compositions of the present invention may be any gas suitable for foaming a settable composition, including, but not limited to, air, nitrogen, or combinations thereof. Generally, the gas should be present in the foamed settable compositions of the present invention in an amount sufficient to form the desired foam. In certain embodiments, the gas may be present in the foamed settable compositions of the present invention in an amount in the range of about 10% to about 80% by volume of the composition.

Where foamed, the settable compositions of the present invention further comprise a surfactant. In some embodiments, the surfactant comprises a foaming and stabilizing surfactant. As used herein, a "foaming and stabilizing surfactant composition" refers to a composition that comprises one or more surfactants and, among other things, may be used to facilitate the foaming of a settable composition and also may stabilize the resultant foamed settable composition formed therewith. Any suitable foaming and stabilizing surfactant composition may be used in the settable compositions of the present invention. Suitable foaming and stabilizing surfactant compositions may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. In one certain embodiment, the foaming and stabilizing surfactant composition comprises a mixture of an ammonium salt of an alkyl ether sulfate, a cocoamidopropyl betaine surfactant, a cocoamidopropyl dimethylamine oxide surfactant, sodium chloride, and water. A suitable example of such a mixture is ZONESEAL® 2000 foaming additive, commercially available from Halliburton Energy Services, Inc. Suitable foaming and stabilizing surfactant compositions are described in U.S. Pat. Nos. 6,797,054, 6,547,871, 6,367,550, 6,063,738, and 5,897,699, the entire disclosures of which are incorporated herein by reference.

Generally, the surfactant may be present in the foamed settable compositions of the present invention in an amount sufficient to provide a suitable foam. In some embodiments, the surfactant may be present in an amount in the range of about 0.8% and about 5% by volume of the water ("bvow").

As mentioned above, the settable compositions may be extended in accordance with embodiments of the present invention, in that the present invention provides extended settable compositions that are capable of remaining in a pumpable fluid state for an extended period of time. For example, the extended settable compositions may be capable of remaining in a pumpable fluid state for at least about 1 day or longer (e.g., at least about 5 days). When desired for use, the extended settable composition may be activated (e.g., by addition of a cement set accelerator) to thereby set into a hardened mass. By way of example, the extended settable composition, after activation, may set to a compressive strength (as determined using the procedure set forth in API Recommended Practice 10B) at 140° F. of at least 100 psi in 72 hours, alternatively at least 500 psi. Among other things, the extended settable compositions of the present invention may be suitable for use in well bore applications, for example, where it is desired to prepare the cement composition in advance. By way of example, the extended settable compositions may facilitate preparation of the settable composition at a convenient location and then transport to the job site for use in the cementing operation.

An example of a suitable extended settable composition of the present invention comprises water, a natural pozzolan, a set retarding additive, and at least one of cement, Portland cement interground with burned shale, or cement kiln dust. Optionally, a suspending agent may be included in the extended settable composition as desired. Other suitable additives, such as those discussed previously, also may be included in the extended settable compositions of the present invention as desired by those of ordinary skill in the art, with the benefit of this disclosure.

Set retarding additives are included in the extended settable compositions of the present invention, in accordance with embodiments of the present invention. Examples of suitable set retarding additives include, but are not limited to, organic acids, lignosulfonates, synthetic retarders and combinations thereof. It has been discovered that certain set retarding additives, such as phosphonated compounds, may not be desirable in certain applications because the settable composition may become over retarded such that the composition does not activate and develop reasonable compressive strength. Examples of organic acids that may be included in the extended settable compositions of the present invention include, but are not limited to, tartaric acid, gluconic acid, carboxylic acids (e.g., citric acid), hydroxy carboxy acids, and combinations thereof. One example of a suitable tartaric acid is HR®-25 cement retarder available from Halliburton Energy Services, Inc. Examples of lignosulfonates that may be included in the extended settable compositions of the present invention include, but are not limited to, a sulfomethylated lignin, calcium lignosulfonates, sodium lignosulfonates, and combinations thereof. Examples of suitable lignosulfonates include HR®-4, HR®-5, and HR®-7 cement retarders available from Halliburton Energy Services, Inc. Examples of synthetic retarders that may be included in the extended settable compositions of the present invention include, but are not limited to, copolymers of acrylic acid and acrylamido-methylpropane sulfonate polymer and copolymers of maleic anhydride and acrylamido-methyl-propane sulfonate polymer. Examples of suitable synthetic retarders include SCR™-100 and SCR™-500 cement retarders available from Halliburton Energy Services, Inc. Examples of suitable synthetic retarders are described in U.S. Pat. Nos. 4,941,536, 5,049,288, 5,472,051, and 5,536,311, the disclosures of which are incorporated herein by reference.

The set retarding additive should be included in the extended settable compositions of the present invention in an amount sufficient for the settable composition to remain in a pumpable fluid state for an extended period of time (e.g., at least about 1 day). In certain embodiments, the set retarding additive may be included in the extended settable composition in an amount in the range of about 0.1% to about 5% bwoc. In certain embodiments, the set retarding additive may be included in the extended settable composition in an amount in the range of about 0.1% to about 1.5% bwoc. Where the set retarding additive comprises tartaric acid, the tartaric acid may be in the extended settable composition in an amount in the range of about 0.2% to about 0.35% bwoc, for example. Where the set retarding additive comprises a sulfomethylated lignin, the sulfomethylated lignin may be, for example, included in the extended settable composition in an amount in the range of about 0.2% to about 1% bwoc. Those of ordinary skill in the art, with the benefit of this disclosure, should be able to determine an appropriate set retarding additive and amount thereof for a particular application.

As previously mentioned, at a desired time for use, the extended settable composition may be activated, for example, by addition of a cement set accelerator. Examples of suitable cement set accelerators include, but are not limited to, calcium chloride, triethanolamine, sodium silicate, zinc formate, calcium acetate, and combinations thereof. An example of a suitable sodium silicate is ECONOLITE™ additive, available from Halliburton Energy Services, Inc. The cement set accelerator should be added to the extended settable composition in an amount sufficient to activate the extended settable composition to set into a hardened mass. In certain embodiments, the cement set accelerator may be added to the extended settable composition in an amount in the range of about 0.1% to about 4% bwoc.

As mentioned above, cement kiln dust and/or a natural pozzolan may be used in embodiments of the present invention to replace higher cost additives (such as Portland cement), resulting in a more economical settable composition. Accordingly, an embodiment of the present invention may include a method of maximizing performance and minimizing cost of the cement composition. An embodiment of the method may comprise: determining one or more desired cement composition parameters for one or more properties selected from the group consisting of compressive strength, pump time, fluid loss, free water content, and rheology; determining a component cost for at least one additive selected from the group consisting of cement kiln dust, a natural pozzolan, a lightweight material, and combinations thereof; designing a cement composition to have the one or more desired cement composition parameters by adjusting the amount of the cement kiln dust, the natural pozzolan, and/or the lightweight material in the cement composition.

The method may include determining one or more desired cement composition parameters for one or more properties selected from the group consisting of compressive strength, pump time, fluid loss, free water content, and rheology. For example, one or more of the properties may be determined to provide a cement composition suitable for use in subterranean cementing. In one embodiment, the one or more desired cement composition parameters may include at least one of a minimum 24-hour compressive strength, a minimum pump time, a minimum fluid loss, a minimum free water content, or a pumpable slurry. In one particular example, properties could be determined for the cement composition to meet or exceed API Specification 10's physical requirements for a particular API cement.

The method further may comprise determining a component cost for at least one additive selected from the group consisting of cement kiln dust, a natural pozzolan, and a lightweight material. Lightweight materials may be included in a cement composition, for example, to provide a lower density. Examples of lightweight materials include, but are not limited to bentonite, gilsonite, expanded perlite, and microspheres (e.g., glass spheres).

The method further may comprise designing a cement composition to have the one or more desired cement composition parameters by adjusting the amount of the cement kiln dust, the natural pozzolan, and/or the lightweight material in the cement composition. Designing the cement composition may include determining a cement composition that will have the desired parameters that were determined. In designing the cement composition, the amount of the cement kiln dust, the natural pozzolan, and/or the lightweight materials should be adjusted in accordance with embodiments of the present invention. By adjusting the amount of these materials, the price of the cement composition may be minimized while providing a cement composition suitable for use in subterranean cementing, in that it has the specified parameters. In certain embodiments, lightweight materials (e.g., certain microspheres) may be a higher cost additive than the cement kiln dust and/or the natural pozzolan. Accordingly, adjusting the relative amounts of these additives may result in a lower cost cement composition. For example, reducing the amount of the lightweight additive with respect to the natural pozzolan and the cement kiln dust may reduce the cost of the cement composition. In addition, as the cement kiln dust and the natural pozzolan may also be less expensive than other components typically used in cement compositions (such as Portland cement), increasing the amounts of these components relative to other components should reduce the cost of the cement composition. In one embodiment, the amount of both the cement kiln dust and the natural pozzolan are adjusted. In another embodiment, the amount of both the cement kiln dust and the lightweight material are adjusted. It should be understood that the amount of the lightweight additive may be reduced to 0% bwoc to provide a lower cost cement composition, in accordance with embodiments of the present invention.

The settable compositions, including the extended settable compositions, of the present invention may be used in a variety of subterranean applications, including, but not limited to, primary cementing, remedial cementing, and drilling operations.

An example of a method of the present invention comprises providing a settable composition of the present invention; placing the settable composition into a well bore. In some embodiments, the settable compositions of the present invention may be foamed. As desired by one of ordinary skill in the art, with the benefit of this disclosure, the settable compositions of the present invention useful in this method may comprise any of the above-listed additives, as well any of a variety of other additives suitable for use in subterranean applications.

Another example of a method of the present invention is a method of cementing a pipe string (e.g., casing, expandable casing, liners, etc.) disposed in a well bore. An example of such a method may comprise providing a settable composition of the present invention; introducing the settable composition into the annulus between the pipe string and a wall of the well bore; and allowing the settable composition to set in the annulus to form a hardened mass. Generally, in most instances, the hardened mass should fix the pipe string in the well bore. In some embodiments, the settable compositions of the present invention may be foamed. As desired by one of ordinary skill in the art, with the benefit of this disclosure, the settable compositions of the present invention useful in this method may comprise any of the above-listed additives, as well any of a variety of other additives suitable for use in subterranean application.

Another example of a method of the present invention is a method of sealing a portion of a gravel pack or a portion of a subterranean formation. An example of such a method may comprise providing a settable composition of the present invention; introducing the settable composition into the portion of the gravel pack or the portion of the subterranean formation; and allowing the settable composition to form a hardened mass in the portion. The portions of the subterranean formation may include permeable portions of the formation and fractures (natural or otherwise) in the formation and other portions of the formation that may allow the undesired flow of fluid into, or from, the well bore. The portions of the gravel pack include those portions of the gravel pack, wherein it is desired to prevent the undesired flow of fluids into, or from, the well bore. Among other things, this method may allow the sealing of the portion of the gravel pack to prevent the undesired flow of fluids without requiring the gravel pack's removal. In some embodiments, the settable compositions of the present invention may be foamed. As desired by one of ordinary skill in the art, with the benefit of this disclosure, the settable compositions of the present invention useful in this method may comprise any of the above-listed additives, as well any of a variety of other additives suitable for use in subterranean applications.

Another example of a method of the present invention is a method of sealing voids located in a pipe string (e.g., casing, expandable casings, liners, etc.) or in a cement sheath. Generally, the pipe string will be disposed in a well bore, and the cement sheath may be located in the annulus between the pipe string disposed in the well bore and a wall of the well bore. An example of such a method may comprise providing a settable composition; introducing the settable composition into the void; and allowing the settable composition to set to form a hardened mass in the void. In some embodiments, the settable compositions of the present invention may be foamed. As desired by one of ordinary skill in the art, with the benefit of this disclosure, the settable compositions of the present invention useful in this method may comprise any of the above-listed additives, as well any of a variety of other additives suitable for use in subterranean applications.

When sealing a void in a pipe string, the methods of the present invention, in some embodiments, further may comprise locating the void in the pipe string; and isolating the void by defining a space within the pipe string in communication with the void; wherein the settable composition may be introduced into the void from the space. The void may be isolated using any suitable technique and/or apparatus, including bridge plugs, packers, and the like. The void in the pipe string may be located using any suitable technique. When sealing a void in the cement sheath, the methods of the present invention, in some embodiments, further may comprise locating the void in the cement sheath; producing a perforation in the pipe string that intersects the void; and isolating the void by defining a space within the pipe string in communication with the void via the perforation, wherein the settable composition is introduced into the void via the perforation. The void in the pipe string may be located using any suitable technique. The perforation may be created in the pipe string using any suitable technique, for example, perforating guns. The void may be isolated using any suitable technique and/or apparatus, including bridge plugs, packers, and the like.

Another example of a method of the present invention is a method of changing the direction of drilling a well bore. An example of such a method may comprise providing a settable composition; introducing the settable composition into the well bore at a location in the well bore wherein the direction of drilling is to be changed; allowing the settable composition to set to form a kickoff plug in the well bore; drilling a hole in the kickoff plug; and drilling of the well bore through the hole in the kickoff plug. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean applications.

Generally, the drilling operation should continue in the direction of the hole drilled through the kickoff plug. The well bore and hole in the kickoff plug may be drilled using any suitable technique, including rotary drilling, cable tool drilling, and the like. In some embodiments, one or more oriented directional drilling tools may be placed adjacent to the kickoff plug. Suitable directional drilling tools include, but are not limited to, whip-stocks, bent sub-downhole motorized drill combinations, and the like. The direction drilling tools then may be used to drill the hole in the kickoff plug so that the hole is positioned in the desired direction. Optionally, the directional drilling tool may be removed from the well bore subsequent to drilling the hole in the kickoff plug.

To facilitate a better understanding of the present invention, the following examples of certain aspects of some embodiments are given. In no way should the following examples be read to limit, or define, the scope of the invention.

EXAMPLE 1

Twenty-nine different cement slurries (i.e., Slurries 1-29) were prepared. Slurries 1-14 and the resulting set cements were then tested to determine their respective 24-hour compressive strengths. As set forth below, the respective test results for Slurries 1-14 demonstrate that slurries comprising cement, cement kiln dust, and pumicite may provide suitable compressive strengths for certain applications. The remainder of the slurries were used for additional testing in Example 2 below.

Slurries 1-29 were prepared by dry blending dry components with cement prior to adding water to form the respective slurry. Slurries 1-10, 13-29 included Holcem ASTM Type III cement. Slurries 11 and 12 included TXI Lightweight cement. The pumicite included in Slurries 4, 7, and 9-29 was 200-mesh pumicite. Liquid additives, if any, were added to the water prior to combination with the cement. Sufficient water was included in Slurries 1-3 and 24-27 to provide a density of 12.5 lb/gal. Sufficient water was included in Slurries 4-23 to provide a density of 12 lb/gal. Sufficient water was included in Slurries 28 and 29 to provide a density of 11 lb/gal. The particular composition of each slurry is provided in the table below.

After Slurries 1-14 were prepared, the slurries were subjected to 24-hour compressive strength tests at 185° F. in accordance with API Recommended Practice 10B. The results of this series of tests are provided in the table below.

TABLE 1

| Slurry | Water[1] (gal/sk) | Cement[2] (% bwoc) | CKD (% bwoc) | Pumicite (% bwoc) | Silica[3] (% bwoc) | Lime (% bwoc) | Glass Beads[4] (% bwoc) | Bentonite (% bwoc) | 185° F. 24-Hour Comp. Strength (psi) |
|---|---|---|---|---|---|---|---|---|---|
| 1 | 11.35 | 75 | 25 | — | 10 | — | — | — | 905 |
| 2 | 10.35 | 65 | 35 | — | — | — | — | — | 471 |
| 3 | 10.52 | 75 | 25 | — | — | — | — | — | 556 |
| 4 | 11.92 | 50 | 25 | 25 | — | 5 | — | — | 549 |
| 5 | 12.41 | 75 | 25 | — | — | — | — | — | 447 |
| 6 | 12.23 | 65 | 35 | — | — | — | — | — | 319 |
| 7 | 12.62 | 75 | 12.5 | 12.5 | — | 5 | — | — | 441 |
| 8 | 13.42 | 75 | 25 | — | 10 | — | — | — | 261 |
| 9 | 12.92 | 50 | 25 | 25 | 10 | 5 | — | — | 920 |
| 10 | 12.37 | 75 | — | 25 | — | 5 | — | — | 1012 |
| 11 | 12.19 | 50 | 25 | 25 | 10 | 5 | — | — | 939 |

TABLE 1-continued

| Slurry | Water[1] (gal/sk) | Cement[2] (% bwoc) | CKD (% bwoc) | Pumicite (% bwoc) | Silica[3] (% bwoc) | Lime (% bwoc) | Glass Beads[4] (% bwoc) | Bentonite (% bwoc) | 185° F. 24-Hour Comp. Strength (psi) |
|---|---|---|---|---|---|---|---|---|---|
| 12 | 12.19 | 50 | 25 | 25[5] | 10 | 5 | — | — | 786 |
| 13 | 12.92 | 50 | 25 | 25[5] | 10 | 5 | — | — | 805 |
| 14 | 12.47 | 50 | 25 | 25 | 10 | — | — | — | 734 |
| 15 | 11.89 | 65 | 17 | 17 | — | — | — | — | — |
| 16 | 11.89 | 65 | 17 | 17 | — | — | — | — | — |
| 17 | 12.65 | 65 | 12 | 23 | 8 | — | — | — | — |
| 18 | 12.94 | 65 | 29 | 6 | 8 | — | — | — | — |
| 19 | 12.76 | 65 | 6 | 29 | 10 | — | — | — | — |
| 20 | 13.1 | 75 | 10 | 25 | — | — | — | — | — |
| 21 | 13.38 | 75 | 13 | 25 | — | — | — | — | — |
| 22 | 10.91 | 57 | 5 | 38 | — | — | — | — | — |
| 23 | 13.28 | 58 | 7 | 35 | — | — | — | — | — |
| 24 | 12.98 | 50 | 5 | 42 | — | — | — | 3 | — |
| 25 | 10.91 | 50 | 5 | 42 | — | — | — | 3 | — |
| 26 | 10.91 | 50 | 5 | 42 | — | — | — | 3 | — |
| 27 | 10.91 | 50 | 5 | 42 | — | — | — | 3 | — |
| 28 | 10.85 | 50 | 5 | 35 | — | — | 10 | — | — |
| 29 | 10.85 | 50 | 5 | 35 | — | — | 10 | — | — |

[1]The amount of water is provided in gallons per 100-pound sack of dry blend.
[2]Holcem ASTM Type III Cement was used in each slurry, except TXI Lightweight cement was used in Slurries 11 and 12.
[3]The amorphous silica included in the slurries was Silicalite ™ cement additive, available from Halliburton Energy Services.
[4]The glass beads included in certain slurries were HGS 6000 hollow glass beads, available from 3M located in Minnesota.
[5]Slurries 12 and 13 contained a composite of 5-, 10-, 200-, and 325-mesh pumicite in equal amounts.

EXAMPLE 2

Additional tests were performed using Slurries 1, 9, and 15-97 from Example 1. In addition to the components identified in Example 1, D-Air™ 3000 defoaming additive and FWCA™ free water control additive were also added to each of these slurries in the amount indicated in the table below. Additionally, each of these slurries also included HR®-601 retarder in the amount indicated in the table below, except for Slurry 913 in which HR®-5 retarder was included. Slurries 16-19, 21-26, 28, and 29 further included Halad® 344 fluid loss control additive in the amount indicated in the table below.

After preparation, the slurries and resulting set cements were then tested to determine their respective fluid loss properties, thickening times, and free water content, in accordance with API Recommended Practice 10B. In addition, an ultrasonic cement analyzer ("UCA") was used to determine a $UCA_{72\,hrs}$ value and a $UCA_{crush}$ value. [The UCA tests were performed in accordance with API Recommended Practice 10B.

The results of this series of tests are provided in the table below.

TABLE 2

| Slurry | Defoamer (% bwoc) | Set Retarder (% bwoc) | FWCA (% bwoc) | FLCA (% bwoc) | Fluid Loss 155° F. (cc/30 min) | Thick. Time 70 bc 155° F. (hr:min) | Free Water 45 inc. 155° F. (%) | UCA 72 hr 190° F. (psi) | UCA Crush 72 hr (psi) |
|---|---|---|---|---|---|---|---|---|---|
| 1a | 0.25 | 1 | 0.3 | — | 280 | 5:50 | 0 | 679 | 691 |
| 1b | 0.25 | 0.5 | 0.3 | — | 240 | 3:35 | 0 | 544 | 680 |
| 1c | 0.25 | 0.75 | 0.3 | — | 290 | 3:54 | — | — | — |
| 9a | 0.5 | 1 | 0.3 | — | 294 | 6:40 | Trace | 1118.8 | 1127 |
| 9b | 0.5 | 1 | 0.3 | — | 235 | — | 1.6 | — | — |
| 9c | 0.5 | 0.5 | 0.3 | — | 321 | 3:03 | Trace | 1066 | 1092 |
| 9d | 0.5 | 0.75 | 0.3 | — | 290 | 4:09 | 0 | — | — |
| 15 | 0.25 | 0.75 | 0.3 | — | 407 | — | — | — | — |
| 16 | 0.25 | 0.75 | 0.2 | 0.2 | 254 | — | — | — | — |
| 17 | 0.25 | 0.75 | 0.25 | 0.15 | 259 | — | — | — | 739 |
| 18 | 0.25 | 0.75 | 0.25 | 0.15 | — | — | — | 392 | 472 |
| 19 | 0.25 | 0.75 | 0.3 | 0.1 | 366 | — | — | — | — |
| 20 | 0.25 | 0.75 | 0.3 | — | 438 | — | — | — | — |
| 21 | 0.25 | 0.75 | 0.3 | 0.1 | 460 | — | — | — | — |
| 22 | 0.25 | 0.5 | 0.3 | 0.15 | 394 | — | 2 ml | — | — |
| 23 | 0.25 | 0.3 | 0.3 | 0.3 | 143 | — | Trace | — | — |
| 24 | 0.25 | 0.3 | 0.3 | 0.2 | 280 | 3:27 | 0 | — | 1024 |
| 25 | 0.25 | 0.4 | 0.3 | 0.2 | 132 | 3:40 | 0 | — | — |

TABLE 2-continued

| Slurry | Defoamer (% bwoc) | Set Retarder (% bwoc) | FWCA (% bwoc) | FLCA (% bwoc) | Fluid Loss 155° F. (cc/30 min) | Thick. Time 70 bc 155° F. (hr:min) | Free Water 45 inc. 155° F. (%) | UCA 72 hr 190° F. (psi) | UCA Crush 72 hr (psi) |
|---|---|---|---|---|---|---|---|---|---|
| 26 | 0.25 | 0.5 | 0.3 | 0.1 | 208 | 3:34 | 0 | 2610 | 2110 |
| 27 | 0.25 | 0.5 | 0.3 | — | 281 | 3:55 | 0 | — | — |
| 28 | — | 0.3 | 0.3 | 0.2 | 256 | 5:16 | 0 | 1193 | —[1] |
| 29 | 0.25 | 0.4 | 0.3 | 0.2 | 235 | 5:52 | 0 | 1400 | —[1] |

[1] The 72-hour UCA crush strengths were not determined for Slurries 28 and 29 because the slurry cracked.

The 24-hour UCA compressive and crush strengths were also determined for Slurries 28 and 29. For Slurry 28, the 24-hour UCA compressive and crush strengths were 1107 psi and 1021 psi, respectively. For Slurry 29, the 24-hour UCA compressive and crush strengths were 1500 psi and 1024 psi, respectively.

Additionally, the rheological properties of the slurries were also determined using a Fann Model 35 viscometer at the temperature indicated in the table below using a bob and sleeve and spring #1. The plastic viscosity and the yield points of the slurries were calculated from Best Rheology using the Generalized Hershel Bulkley Model. The results of this series of tests are provided in the table below.

TABLE 3

| Slurry | Temp. (° F.) | Rotational Viscometer (Bob & Sleeve; Spring #1) | | | | | | | | Plastic Viscosity | Yield Point |
|---|---|---|---|---|---|---|---|---|---|---|---|
| | | 600 | 300 | 200 | 100 | 60 | 30 | 6 | 3 | | |
| 1a | 80 | 116 | 73 | 56 | 37 | 27 | 18 | 9 | 8 | 54 | 19 |
| | 155 | 162 | 130 | 95 | 64 | 52 | 41 | 30 | 28 | 99 | 31 |
| 1b | 80 | 147 | 95 | 72 | 46 | 35 | 25 | 16 | 15 | 74 | 21 |
| | 155 | 151 | 125 | 90 | 59 | 46 | 36 | 25 | 24 | 99 | 26 |
| 1c | 80 | 131 | 72 | 48 | 37 | 27 | 20 | 19 | 18 | 53 | 20 |
| | 155 | 142 | 123 | 90 | 64 | 53 | 44 | 32 | 30 | 88 | 37 |
| 9a | 80 | 126 | 78 | 60 | 38 | 27 | 18 | 9 | 8 | 60 | 18 |
| | 155 | 129 | 95 | 69 | 44 | 34 | 26 | 18 | 17 | 77 | 18 |
| 9b | 80 | 120 | 76 | 56 | 34 | 24 | 15 | 6 | 4 | 63 | 13 |
| | 155 | 68 | 45 | 29 | 16 | 11 | 6 | 2 | 2 | 44 | 1 |
| 9c | 80 | 115 | 70 | 53 | 33 | 24 | 16 | 8 | 8 | 56 | 14 |
| | 155 | 100 | 74 | 53 | 34 | 27 | 21 | 14 | 13 | 60 | 14 |
| 9d | 80 | 129 | 84 | 62 | 39 | 29 | 20 | 10 | 8 | 68 | 16 |
| | 155 | 122 | 94 | 70 | 46 | 36 | 28 | 20 | 19 | 72 | 22 |
| 15 | 80 | 86 | 51 | 40 | 25 | 18 | 12 | 5 | 4 | 39 | 13 |
| | 155 | 105 | 80 | 59 | 40 | 32 | 25 | 18 | 17 | 60 | 21 |
| 16 | 80 | 68 | 38 | 28 | 16 | 11 | 6 | 2 | 1 | 22 | 5 |
| | 155 | 61 | 45 | 28 | 15 | 10 | 6 | 2 | 1 | 45 | 0 |
| 17 | 80 | 92 | 55 | 40 | 24 | 16 | 9 | 3 | 3 | 47 | 8 |
| | 155 | 89 | 57 | 40 | 23 | 15 | 9 | 4 | 3 | 51 | 6 |
| 18 | 80 | 96 | 55 | 41 | 25 | 17 | 11 | 3 | 2 | 45 | 10 |
| | 155 | 79 | 53 | 37 | 21 | 15 | 10 | 4 | 4 | 48 | 5 |
| 19 | 80 | 110 | 58 | 46 | 29 | 20 | 12 | 5 | 5 | 44 | 14 |
| | 155 | 107 | 79 | 54 | 33 | 24 | 17 | 11 | 10 | 69 | 10 |
| 20 | 80 | 85 | 61 | 48 | 35 | 28 | 15 | 9 | 7 | 39 | 22 |
| | 155 | 101 | 72 | 52 | 33 | 26 | 19 | 13 | 12 | 59 | 13 |
| 21 | 80 | 83 | 51 | 38 | 24 | 17 | 10 | 4 | 3 | 41 | 10 |
| | 155 | 86 | 61 | 41 | 25 | 18 | 13 | 8 | 8 | 54 | 7 |
| 22 | 80 | 115 | 72 | 56 | 36 | 25 | 16 | 5 | 4 | 54 | 18 |
| | 155 | 95 | 70 | 47 | 27 | 19 | 12 | 4 | 3 | 64 | 6 |
| 23 | 80 | 114 | 73 | 57 | 36 | 25 | 15 | 7 | 6 | 55 | 8 |
| | 155 | 75 | 52 | 35 | 20 | 13 | 8 | 3 | 2 | 48 | 4 |
| 24 | 80 | 129 | 86 | 65 | 40 | 28 | 18 | 5 | 4 | 69 | 17 |
| | 155 | 90 | 57 | 46 | 29 | 21 | 13 | 5 | 4 | 42 | 15 |
| 25 | 80 | 207 | 131 | 103 | 67 | 49 | 31 | 11 | 8 | 96 | 35 |
| | 155 | 155 | 115 | 81 | 49 | 34 | 21 | 7 | 5 | 99 | 16 |
| 26 | 80 | 202 | 120 | 94 | 61 | 44 | 29 | 13 | 11 | 89 | 31 |
| | 155 | 159 | 121 | 85 | 50 | 35 | 23 | 10 | 8 | 107 | 14 |
| 27 | 80 | 184 | 126 | 96 | 62 | 46 | 32 | 18 | 17 | 96 | 30 |
| | 155 | 165 | 146 | 103 | 91 | 71 | 55 | 40 | 37 | 83 | 63 |
| 28 | 80 | 265 | 178 | 141 | 93 | 69 | 45 | 17 | 15 | 128 | 50 |
| | 155 | 194 | 158 | 114 | 69 | 48 | 30 | 10 | 7 | 134 | 24 |
| 29 | 80 | 281 | 198 | 163 | 100 | 75 | 49 | 18 | 15 | 147 | 51 |
| | 155 | 216 | 175 | 124 | 77 | 56 | 41 | 14 | 9 | 147 | 28 |

Example 2 thus indicates that slurries containing pumicite may provide suitable properties for certain applications.

EXAMPLE 3

Additional tests were performed using Slurries 9-11 from Example 1. In particular, each of Slurries 9-11 were extended using a set retarder (HR®-5 retarder). After remaining in a liquid state for 24 hours, each slurry was activated using calcium chloride in an amount of 4% bwoc. The 72-hour compressive strength of the resultant set cement was then determined at the temperature indicated in the table below, in accordance with API Recommended Practice 10B. The results of this series of tests are provided in the table below.

TABLE 4

| Slurry | Cement[1] (% bwoc)) | CKD (% bwoc) | Pumicite (% bwoc) | Set Retarder (% bwoc) | Hours Liquid | Calcium Chloride (% bwoc) | 185° F. 72-Hour Comp. Strength (psi) |
|---|---|---|---|---|---|---|---|
| 9 | 50 | 25 | 25 | 1.5 | 24 | 4 | 1074 |
| 10 | 75 | — | 25 | 1 | 24 | 4 | 959 |
| 11 | 50 | 25 | 25 | 1 | 24 | 4 | 626 |

[1]Holcem ASTM Type III Cement was used in Slurries 9 and 10, and TXI Lightweight cement was used in Slurry 11.

Example 3 thus indicates that slurries containing cement, CKD, and pumicite may be extended, for example, by use of appropriate set retarders.

EXAMPLE 4

Additional tests were performed using Slurries 9-11 from Example 1. In particular, each of Slurries 9-11 were foamed with air from a base density of 12 ppg to the density indicated in the table below. The foaming additive included in each slurry was Zoneseal® 2000 foaming additive in an amount of 2% by volume of water. The 72-hour compressive strength of the resultant set cement was then determined at the temperature indicated in the table below, in accordance with API Recommended Practice 10B. The results of this series of tests are provided in the table below.

Examples 4 thus indicates that slurries containing cement, CKD, and pumicite may be foamed, for example, by use of appropriate foaming additives.

EXAMPLE 5

Five additional slurries (i.e., Slurries 30-34) were prepared. The slurries and resulting set cements were then tested to determine their respective mechanical properties, fluid-loss properties, rheological properties, and the like. As set forth below, the respective test results for the five different slurries demonstrate that slurries comprising pumicite may provide suitable compressive strengths for certain applications.

Slurries 30-34 were prepared by dry blending dry components with cement prior to adding water to form the respective slurry. Liquid additives, if any, were added to the water prior to combination with the cement. Sufficient water was included in Slurries 30-32 to provide a density of 10.5 ppg, and sufficient water was included in Slurries 33 and 34 to provide a density of 12 ppg. In addition to other components, each slurry included Holcem ASTM Type III cement, 200-mesh Pumicite, and Joppa cement kiln dust. The composition of each slurry is listed in the table below.

TABLE 5

| Slurry | Cement[1] (% bwoc) | CKD (% bwoc) | Pumicite (% bwoc) | Silica[2] (% bwoc) | Lime (% bwoc) | Foaming Additive (% bvow) | Base Density (ppg) | Foam Density (ppg) | Target Density (ppg) | 185° F. 72-Hour Comp. Strength (psi) |
|---|---|---|---|---|---|---|---|---|---|---|
| 9 | 50 | 25 | 25 | 10 | 5 | 2 | 12 | 9.52 | 10 | 411 |
| 10 | 75 | — | 25 | — | 5 | 2 | 12 | 9.36 | 10 | 343 |
| 11 | 50 | 25 | 25 | 10 | 5 | 2 | 12 | 9.76 | 10 | 561 |

[1]Holcem ASTM Type III Cement was used in Slurries 9 and 10, and TXI Lightweight cement was used in Slurry 11.
[2]The amorphous silica included in the slurries was Silicalite ™ cement additive, available from Halliburton Energy Services.

TABLE 6

| Slurry | Density (ppg) | Water (gal/sk)[1] | Cement (% bwoc) | Pumicite (% bwoc) | CKD (% bwoc) | Bentonite (% bwoc) | Silica Flour[2] (% bwoc) | Glass Beads[3] (% bwoc) |
|---|---|---|---|---|---|---|---|---|
| 30 | 10.5 | 10.05 | 50 | 32 | 5 | — | — | 13 |
| 31 | 10.5 | 10.07 | 50 | 32 | 5 | — | — | 13 |
| 32 | 10.5 | 10.06 | 50 | 32 | 5 | — | — | 13 |
| 33 | 12 | 15 | 50 | 42 | 5 | 3 | 17 | — |
| 34 | 12 | 12.98 | 50 | 42 | 5 | 3 | — | — |

[1]The amount of water is provided in gallons per 100-pound sack of dry blend.
[2]The silica flour included in Slurry 33 was SSA-1 ™ strength stabilizing additive, available from Halliburton Energy Services.
[3]The glass beads included in certain slurries were 8000# psi beads with a specific gravity of 42, available from 3M located in Minnesota.

Slurry 30 further included D-Air™ 3000 defoaming additive (0.25% bwoc), FWCA™ free water control additive (0.15% bwoc), HR®-601 retarder (0.6% bwoc), and Halad®-344 fluid loss control additive (0.6% bwoc).

Slurry 31 further included D-Air™ 3000 defoaming additive (0.25% bwoc), FWCA™ free water control additive (0.15% bwoc), HR®-601 retarder (0.3% bwoc), and Halad®-344 fluid loss control additive (0.4% bwoc).

Slurry 32 further included D-Air™ 3000 defoaming additive (0.25% bwoc), FWCA™ free water control additive (0.15% bwoc), HR®-601 retarder (0.4% bwoc), and Halad®-344 fluid loss control additive (0.4% bwoc).

Slurry 33 further included D-Air™ 3000 defoaming additive (0.25% bwoc), FWCA™ free water control additive (0.25% bwoc), HR®-601 retarder (0.3% bwoc), and Halad®-344 fluid loss control additive (0.5% bwoc), and SA-541™ suspending aid (0.3% bwoc).

Slurry 34 further included D-Air™ 3000 defoaming additive (0.25% bwoc), FWCA™ free water control additive (0.3% bwoc), HR®-601 retarder (0.3% bwoc), and Halad® 344 fluid loss control additive (0.2% bwoc).

After the slurries were prepared, the slurries and resulting set cements were then tested to determine their respective fluid loss properties, thickening times, and free water content at the temperatures indicated in the table below in accordance with API Recommended Practice 10B. In addition, the UCA was used to determine the time to 50 psi, time to 500 psi, a $UCA_{72\,hrs}$ value, and a $UCA_{crush}$ value. The UCA tests were performed in accordance with API Recommended Practice 10B. Additionally, the rheological properties of the slurries were also determined using a Fann Model 35 viscometer at the temperature indicated in the table below using a bob and sleeve and spring #1. The plastic viscosity and the yield points of the slurries were calculated from Best Rheology using the Generalized Hershel Bulkley Model. The results of this series of tests are provided in the table below.

TABLE 7

| Slurry | Fluid Loss 200° F. (cc/30 min) | Thick. Time[1] 70 bc (hr:min) | Free Water[2] 45 inc. (%) | UCA 24 hr 190° F. (psi) | UCA Crush 24 hr (psi) | 190° F. Time to 50 psi | 190° F. Time to 500 psi | 80° PV/YP | 155° PV/YP | 200° PV/YP |
|---|---|---|---|---|---|---|---|---|---|---|
| 30 | 58 | 11:45 | 0 | 873 | 2140 | 6:58 | 7:35 | 150/35 | — | 102/29 |
| 31 | 88 | 3:26 | 0 | 1027 | 2040 | 5:14 | 5:28 | 131/29 | — | 85/27 |
| 32 | — | 5:49 | — | — | — | — | — | — | — | — |
| 33 | 80 | 6:03 | Trace | 836 | 1024 | 4:51 | 5:52 | 65/13 | — | 60/15 |
| 34 | 280 | 3:27 | 0 | 1374 | 1367 | 4:52 | 8:37 | 69/17 | 42/15 | — |

[1]The thickening time tests were performed at 217° F., except the thickening time for Slurry 34 was determined at 155° F.
[2]The free-water tests were performed at 200° F. for Slurries 30-33. The free-water test for Slurry 34 was determined at 155° F.

Example 5 thus indicates that slurries containing pumicite may provide suitable properties for certain applications.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of cementing in a subterranean formation comprising:
   introducing a cement composition into the subterranean formation, wherein the cement composition comprises:
   Portland cement interground with burned shale,
   cement kiln dust,
   a natural pozzolan, and
   water; and
   allowing the cement composition to set.

2. The method of claim 1 wherein the introducing the cement composition into the subterranean formation comprises introducing the cement composition into a space between a pipe string and the subterranean formation.

3. The method of claim 2 comprising introducing the pipe string into a well bore penetrating the subterranean formation.

4. The method of claim 1 wherein the cement composition is foamed and further comprises a gas and a surfactant.

5. The method of claim 1 wherein the cement composition comprises at least one cement selected from the group consisting of a pozzolana cement, a gypsum cement, a high alumina content cement, a slag cement, a silica cement, and a combination thereof.

6. The method of claim 1 wherein the natural pozzolan comprises pumicite.

7. The method of claim 1 wherein the natural pozzolan is present in an amount of about 0.1% to about 50% by weight of cementitious components.

8. The method of claim 1 wherein the cement composition comprises at least one additive selected from the group consisting of a strength-retrogression additive, a set accelerator, a set retarder, a weighting agent, a lightweight additive, a weighting additive, a gas-generating additive, a mechanical property enhancing additive, a lost-circulation material, a filtration-control additive, a dispersant, a defoaming agent, a foaming agent, a thixotropic additive, and a combination thereof.

9. The method of claim 1 wherein the cement composition comprises at least one additive selected from the group consisting of fly ash, slag, metakaolin, shale, zeolite, lime, crystalline silica, amorphous silica, fumed silica, a salt, fiber, hydratable clay, a microsphere, rice husk ash, an elastomer, a resin, latex, and combinations thereof.

10. The method of claim 1 comprising:
    determining one or more desired cement composition parameters for at least one property selected from the group consisting of compressive strength, pump time, fluid loss, free water content, rheology, and a combination thereof
    determining a component cost for at least one additive selected from the group consisting of the cement kiln dust, the natural pozzolan, a lightweight material, and a combination thereof; and
    designing the cement composition to have the one or more desired cement composition parameters by adjusting the amount of the cement kiln dust, the natural pozzolan, and/or the lightweight material in the cement composition.

11. The method of claim 10 wherein adjusting the amount comprises adjusting the amount of the cement kiln dust and the lightweight material in the cement composition.

12. The method of claim 10 wherein adjusting the amount comprises adjusting the amount of the cement kiln dust and the natural pozzolan in the cement composition.

13. The method of claim 1 wherein the cement composition is extended and further comprises a set retarding additive.

14. A method of cementing in a subterranean formation comprising:
    introducing a cement composition into the subterranean formation, wherein the cement composition comprises:
    Portland cement interground with burned shale,
    cement kiln dust,
    a natural pozzolan comprising at least one pozzolan selected from the group consisting of pumicite, diatomaceous earth, volcanic ash, opaline shale, tuff, and a combination thereof, and
    water; and
    allowing the cement composition to set.

15. The method of claim 14 wherein the introducing the cement composition into the subterranean formation comprises introducing the cement composition into a space between a pipe string and the subterranean formation.

16. The method of claim 15 further comprising introducing the pipe string into a well bore penetrating the subterranean formation.

17. The method of claim 14 wherein the cement composition is foamed and further comprises a gas and a surfactant.

18. The method of claim 14 wherein the cement composition further comprises at least one cement selected from the group consisting of, a pozzolana cement, a gypsum cement, a high alumina content cement, a slag cement, a silica cement, and a combination thereof.

19. The method of claim 14 wherein the natural pozzolan is present in an amount of about 0.1% to about 50% by weight of cementitious components.

20. The method of claim 14 wherein the cement composition further comprises at least one additive selected from the group consisting of a strength-retrogression additive, a set accelerator, a set retarder, a weighting agent, a lightweight additive, a weighting additive, a gas-generating additive, a mechanical property enhancing additive, a lost-circulation material, a filtration-control additive, a dispersant, a defoaming agent, a foaming agent, a thixotropic additive, and a combination thereof.

21. The method of claim 14 wherein the cement composition further comprises at least one additive selected from the group consisting of fly ash, slag, metakaolin, shale, zeolite, lime, crystalline silica, amorphous silica, fumed silica, a salt, fiber, hydratable clay, a microsphere, rice husk ash, an elastomer, a resin, latex, and a combination thereof.

22. The method of claim 14 further comprising:
    determining one or more desired cement composition parameters for at least one property selected from the group consisting of compressive strength, pump time, fluid loss, free water content, rheology, and a combination thereof
    determining a component cost for at least one additive selected from the group consisting of the cement kiln dust, the pumicite, a lightweight material, and a combination thereof; and
    designing the cement composition to have the one or more desired cement composition parameters by adjusting the amount of the cement kiln dust, the natural pozzolan, and/or the lightweight material in the cement composition.

23. The method of claim 22 wherein adjusting the amount comprises adjusting the amount of the cement kiln dust and the lightweight material in the cement composition.

24. The method of claim 22 wherein adjusting the amount comprises adjusting the amount of the cement kiln dust and the natural pozzolan in the cement composition.

25. The method of claim 14 wherein the cement composition is extended and further comprises a set retarding additive.

26. A method of cementing in a subterranean formation comprising:
  providing a cement composition that comprises:
    Portland cement interground with burned shale,
    cement kiln dust,
    pumicite,
    lime, and
    water;
  introducing the cement composition into the subterranean formation; and
  allowing the cement composition to set.

* * * * *

UNITED STATES PATENT AND TRADEMARK OFFICE
CERTIFICATE OF CORRECTION

| | | |
|---|---|---|
| PATENT NO. | : 7,631,692 B2 | Page 1 of 1 |
| APPLICATION NO. | : 12/420630 | |
| DATED | : December 15, 2009 | |
| INVENTOR(S) | : Craig W. Roddy et al. | |

It is certified that error appears in the above-identified patent and that said Letters Patent is hereby corrected as shown below:

The U.S. Patent Publication number in Column 7, line 49 reading "No. 2007/10056475 A1" should be corrected to --No. 2007/0056475 A1--.

Signed and Sealed this
Twenty-eighth Day of August, 2012

David J. Kappos
*Director of the United States Patent and Trademark Office*